(12) United States Patent
Tsuchiya et al.

(10) Patent No.: US 10,974,725 B2
(45) Date of Patent: Apr. 13, 2021

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Masamitsu Tsuchiya, Wako (JP); Hideki Matsunaga, Wako (JP); Yasuharu Hashimoto, Wako (JP); Etsuo Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 16/264,715

(22) Filed: Feb. 1, 2019

(65) Prior Publication Data
US 2019/0241188 A1 Aug. 8, 2019

(30) Foreign Application Priority Data

Feb. 7, 2018 (JP) .............................. JP2018-020557

(51) Int. Cl.
*B60W 30/18* (2012.01)
*B60W 10/04* (2006.01)
*B60W 10/20* (2006.01)

(52) U.S. Cl.
CPC ...... *B60W 30/18163* (2013.01); *B60W 10/04* (2013.01); *B60W 10/20* (2013.01); *B60W 2554/00* (2020.02); *B60W 2710/18* (2013.01); *B60W 2710/20* (2013.01); *B60W 2720/106* (2013.01)

(58) Field of Classification Search
None
See application file for complete search history.

(56) References Cited

U.S. PATENT DOCUMENTS

| 9,248,834 B1* | 2/2016 | Ferguson | B60W 30/0956 |
| 9,501,932 B2* | 11/2016 | Sakai | G08G 1/161 |
| 2018/0257661 A1* | 9/2018 | Kroop | G01S 17/86 |
| 2018/0374341 A1* | 12/2018 | Branson | G07C 5/008 |
| 2019/0129434 A1* | 5/2019 | Morimura | B60W 10/18 |

(Continued)

FOREIGN PATENT DOCUMENTS

JP 2017-035902 2/2017

*Primary Examiner* — Dale W Hilgendorf
*Assistant Examiner* — Alexander C. Bost
(74) *Attorney, Agent, or Firm* — Amin, Turocy & Watson, LLP

(57) ABSTRACT

Provided is a vehicle control apparatus (100) which includes a recognition unit (130) configured to recognize a surrounding situation of a vehicle, and driving control units (140 and 160) configured to automatically control acceleration or deceleration and steering of the vehicle on the basis of a surrounding situation recognized by the recognition unit, in which, in a case that a stop position of the vehicle is recognized in the traveling direction of the vehicle by the recognition unit, and a traffic participant proceeding at a speed lower than the speed of the vehicle in the traveling direction is recognized in front of the stop position, the driving control unit determines whether the traffic participant catches up with the vehicle before the vehicle reaches the stop position, and determines to cause the vehicle to reach further ahead of the traffic participant in the traveling direction on the basis of a result of the determination.

9 Claims, 10 Drawing Sheets

(56) References Cited

U.S. PATENT DOCUMENTS

2019/0152490 A1* 5/2019 Lan .................. B60W 30/0956
2019/0161080 A1* 5/2019 Gochev ............... G05D 1/0088
2019/0329771 A1* 10/2019 Wray ................... B60W 30/09

* cited by examiner

VEHICLE CONTROL APPARATUS, VEHICLE CONTROL METHOD, AND STORAGE MEDIUM

CROSS-REFERENCE TO RELATED APPLICATION

This application claims priority based on Japanese Patent Application No. 2018-020557 filed in Japan on Feb. 7, 2018, the entire content of which is incorporated herein by reference.

BACKGROUND

Field of the Invention

The present invention relates to a vehicle control apparatus, a vehicle control method, and a storage medium.

Background

In recent years, research on automatically controlling a vehicle has been advanced. In relation to this, a technology of controlling a host vehicle in a case that it overtakes another vehicle and the like in the vicinity thereof is known (for example, see Japanese Unexamined Patent Application, First Publication No. 2017-35902).

SUMMARY

However, a host vehicle is not controlled in consideration of a future stopped state of the host vehicle after it overtakes a traffic participant such as another vehicle in the conventional technology. As a result, the traffic participant may catch up with the host vehicle due to the stopped state of the host vehicle stopping at a stop position, and thereby inappropriate effect may be given to the traffic participant in some cases.

The present invention has been made in view of such circumstances, and an object thereof is to provide a vehicle control apparatus, a vehicle control method, and a storage medium which can reduce an effect on a traffic participant to be overtaken.

A vehicle control system, a vehicle control method, and a storage medium according to the present invention have adopted the following configuration.

(1): A vehicle control apparatus according to one aspect of the present invention includes a recognition unit configured to recognize a surrounding situation of a vehicle, and a driving control unit configured to automatically control acceleration or deceleration and steering of the vehicle on the basis of a surrounding situation recognized by the recognition unit, in which, in a case that a stop position of the vehicle is recognized in the traveling direction of the vehicle by the recognition unit, and a traffic participant proceeding at a speed lower than the speed of the vehicle in the traveling direction is recognized in front of the stop position, the driving control unit determines whether the vehicle will catch up with the traffic participant before the vehicle reaches the stop position, and determines whether to cause the vehicle to reach further ahead of the traffic participant in the traveling direction on the basis of a result of the determination.

(2): In the aspect of (1) described above, in a case that the vehicle does not obstruct a passage of the traffic participant, the driving control unit determines to cause the vehicle to reach further ahead of the traffic participant in the traveling direction.

(3): In the aspect of (1) described above, in a case that a distance between a position at which the vehicle catches up with the traffic participant and the stop position is a predetermined distance or more, the driving control unit determines to cause the vehicle to reach further ahead of the traffic participant in the traveling direction.

(4): In the aspect of (1) described above, in a case that a following time in a case in which the vehicle is not caused to reach further ahead of the traffic participant is predicted to be equal to or more than a predetermined time, the driving control unit determines to cause the vehicle to reach further ahead of the traffic participant in the traveling direction.

(5): In the aspect of (1) described above, the driving control unit determines whether to cause the vehicle to reach further ahead of the traffic participant in the traveling direction in accordance with attributes of the traffic participant.

(6): In the aspect of (1) described above, in a case that it is determined that the vehicle catches up with the traffic participant before the vehicle reaches the stop position, the driving control unit evaluates a total cost of a risk occurring in the traffic participant, and determines to cause the vehicle to reach further ahead of the traffic participant in the traveling direction on the basis of a result of the evaluation.

(7): In the aspect of (1) described above, the traffic participant is a non-motorized vehicle or a pedestrian.

(8): A vehicle control method according to another aspect of the present invention is a vehicle control method executed by a computer mounted on a vehicle, and causes a computer to recognize a surrounding situation of a vehicle, automatically control acceleration or deceleration and steering of the vehicle on the basis of a recognized surrounding situation, determine, in a case that a stop position of the vehicle is recognized in a traveling direction of the vehicle, and a traffic participant proceeding at a speed lower than a speed of the vehicle in the traveling direction is recognized in front of the stop position, whether the vehicle catches up with the traffic participant before the vehicle reaches the stop position, and determine whether to cause the vehicle to reach further ahead of the traffic participant in the traveling direction on the basis of a result of the determination.

(9): A storage medium according to still another aspect of the present invention is a computer readable non-transitory storage medium storing a program which causes a computer to recognize a surrounding situation of a vehicle, automatically control acceleration or deceleration and steering of the vehicle on the basis of a recognized surrounding situation, determine, in a case that a stop position of the vehicle is recognized in a traveling direction of the vehicle, and a traffic participant proceeding at a speed lower than a speed of the vehicle in the traveling direction in front of the stop position is recognized, whether the vehicle catches up with the traffic participant before the vehicle reaches the stop position, and determine whether to cause the vehicle to reach further ahead of the traffic participant in the traveling direction on the basis of a result of the determination.

According to the aspects of (1) to (9), it is possible to reduce an effect on a traffic participant to be overtaken.

According to the aspects of (2) to (4), it is possible to further reduce an effect on a traffic participant in accordance with a state of the traffic participant.

According to the aspect of (5), it is possible to further reduce an effect on a traffic participant in accordance with attributes of the traffic participant.

According to the aspect of (6), it is possible to further reduce an effect on a traffic participant more reliably by evaluating the effect according to a specific evaluation reference.

DETAILED DESCRIPTION OF THE INVENTION

Hereinafter, embodiments of a vehicle control apparatus, a vehicle control method, and a storage medium will be described with reference to drawings. In the following description, a case in which a law of left-hand driving is applied will be described, but, in a case that a law of right-hand driving is applied, the left and right may be reversely read.

First Embodiment

Overall Configuration

Figure 1:
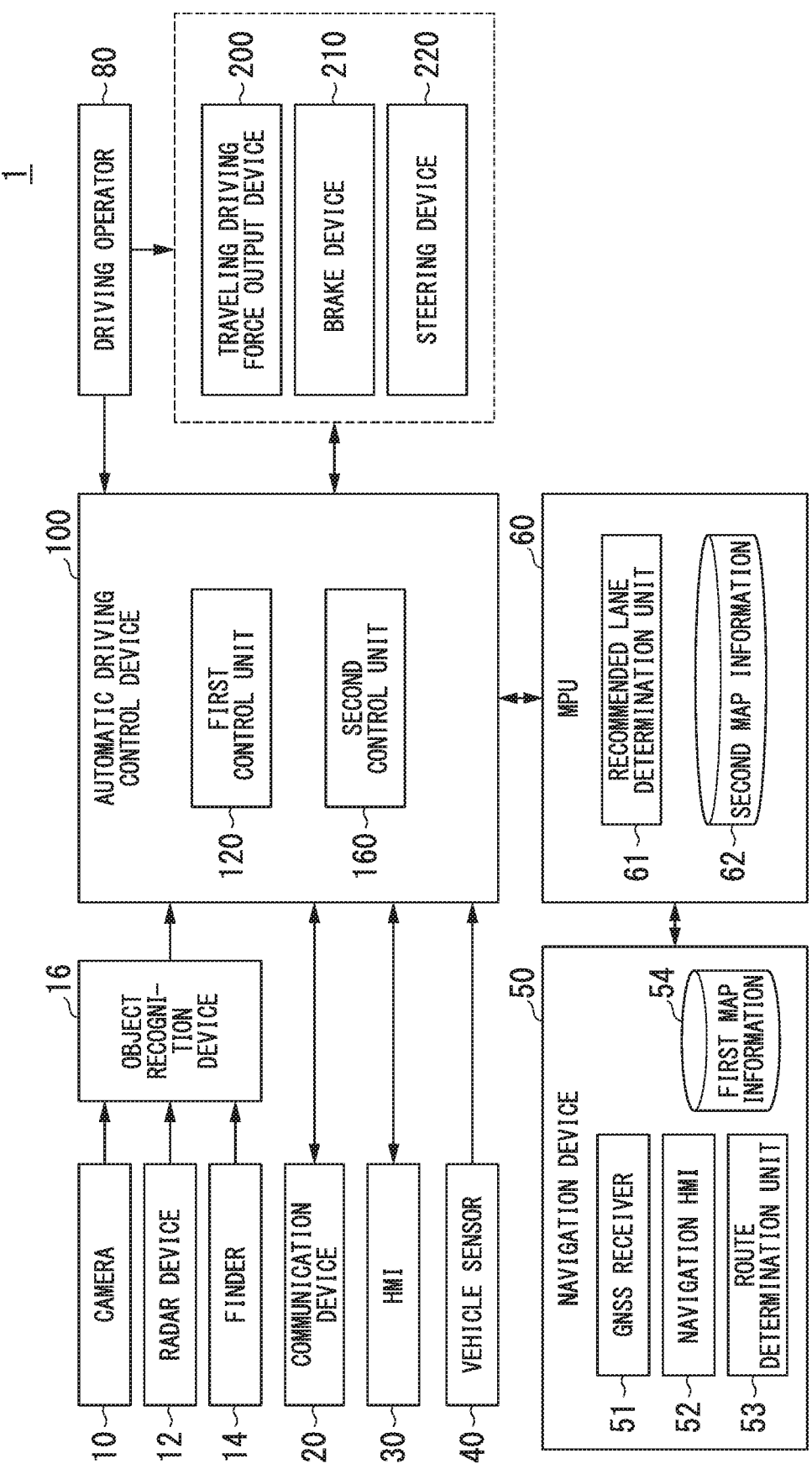
FIG. 1 is a configuration diagram of a vehicle system using a vehicle control apparatus according to a first embodiment.

FIG. 1 is a configuration diagram of s vehicle system 1 using a vehicle control apparatus according to a first embodiment. A vehicle on which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine, or discharge power of a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automatic driving control device (vehicle control apparatus) 100, a traveling driving force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted, or other constituents may be added.

The camera 10 is, for example, a digital camera using a solid-state imaging device such as a charge coupled device (CCD) or complementary metal oxide semiconductor (CMOS). The camera 10 is attached to an arbitrary place on a vehicle (hereinafter, a host vehicle M) on which the vehicle system 1 is mounted. In the case of imaging the front, the camera 10 is attached to an upper portion of a front windshield, a rear surface of the room mirror, or the like. The camera 10, for example, periodically repeats imaging the surroundings of the host vehicle M. The camera 10 may also be a stereo camera.

The radar device 12 emits radio waves such as millimeter waves to the vicinity of the host vehicle M, and detects at least a position (a distance to and an orientation) of an object by detecting radio waves (reflected waves) reflected by the object. The radar device 12 is attached to an arbitrary place of the host vehicle M. The radar device 12 may also detect a position and a speed of an object using a frequency modulated continuous wave (FM-CW) method.

The finder 14 is light detection and ranging (LIDAR) device. The finder 14 emits light to a vicinity of the host vehicle M and measures scattered light. The finder 14 detects a distance to an object on the basis of time from light emission to light reception. The emitted light is, for example, pulse-shaped laser light. The finder 14 is attached to an arbitrary place of the host vehicle M.

The object recognition device 16 recognizes the position, type, speed, and the like of an object by performing sensor fusion processing on detection results using some or all of the camera 10, the radar device 12, and the finder 14. The object recognition device 16 outputs a result of the recognition to the automatic driving control device 100. The object recognition device 16 may output the detection results of the camera 10, the radar device 12, and the finder 14 to the automatic driving control device 100 as they are. The object recognition device 16 may also be omitted from the vehicle system 1.

The communication device 20 communicates with other vehicles present in the vicinity of the host vehicle M using, for example, a cellular network, a Wi-Fi (registered trademark) network, a Bluetooth (registered trademark), a dedicated short range communication (DSRC), and the like, or communicates with various types of server devices via a wireless base station. The communication device 20 may communicate with a surrounding signal device or communicate with various types of server devices via the wireless base station, and acquire information on a timing at which a display of the signal device is switched.

The HMI 30 presents various types of information to an occupant of the host vehicle M and accepts an input operation of an occupant. The HMI 30 includes various display devices, a speaker, a buzzer, a touch panel, a switch, a key, and the like.

The vehicle sensor 40 includes a vehicle speed sensor that detects a speed of the host vehicle M, an acceleration sensor that detects an acceleration, a yaw rate sensor that detects an angular speed around a vertical axis, an orientation sensor that detects a direction of the host vehicle M, and the like.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or supplemented by an inertial navigation system (INS) using an output of the vehicle sensor 40. The navigation HMI 52 includes a display device, a speaker, a touch panel, a key, and the like. The navigation HMI 52 may be partly or entirely shared with the HMI 30 described above. The route determination unit 53 determines, for example, a route (hereinafter, a route on a map) from the position (or an arbitrary input position) of the host vehicle M specified by the GNSS receiver 51 to a destination input by an occupant using the navigation HMI 52 with reference to the first map information 54. The first map information 54 is information in which a road shape is expressed by a link indicating a road and nodes connected by a link. The first map information 54 may also include curvature of a road, point of interest (POI) information, and the like. The route on a map is output to the MPU 60. The navigation device 50 may also perform route guidance using the navigation HMI 52 on the basis of the route on a map. The navigation device 50 may be realized, for example, by a function of a terminal device such as a smartphone or a tablet terminal possessed by an occupant. The navigation device 50 may transmit a current position and a destination to a navigation server via the communication device 20, and acquire a route equivalent to the route on a map from the navigation server.

The MPU 60 includes, for example, a recommended lane determination unit 61, and holds second map information 62 in a storage device such as an HDD or a flash memory. The recommended lane determination unit 61 divides a route on a map provided from the navigation device 50 into a plurality of blocks (for example, divides every 100 ml in a vehicle traveling direction), and determines a recommended lane for each block with reference to the second map information 62. The recommended lane determination unit 61 makes a decision on which lane numbered from the left to travel. The recommended lane determination unit 61 determines a recommended lane such that the host vehicle M can travel along a reasonable route for proceeding to a branch destination in a case that there is the branch destination on the route on a map.

The second map information 62 is map information with higher accuracy than the first map information 54. The second map information 62 includes, for example, information on a center of a lane, information on a boundary of a lane, or the like. The second map information 62 may include road information, traffic regulations information, address information (an address and a zip code), facility information, telephone number information, and the like. The second map information 62 may be updated at any time by the communication device 20 communicating with other devices.

The driving operator 80 includes, for example, an accelerator pedal, a brake pedal, a shift lever, a steering wheel, variant steering, a joystick, and other operators. A sensor for detecting an amount of operation and the presence or absence of an operation is attached to the driving operator 80, and a result of the detection is output to some or all of the automatic driving control device 100, the traveling driving force output device 200, the brake device 210, and the steering device 220.

The automatic driving control device 100 includes, for example, a first control unit 120 and a second control unit 160. Each of the first control unit 120 and the second control unit 160 is realized by, for example, a hardware processor such as a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), a graphics processing unit (GPU), and may also be realized by cooperation of software and hardware. A program may be previously stored in a storage device such as an HDD or flash memory of the automatic driving control device 100, and may be installed in the HDD or flash memory of the automatic driving control device 100 by being stored in a detachable storage medium such as a DVD or a CD-ROM and mounting the storage medium onto a drive device.

Figure 2:
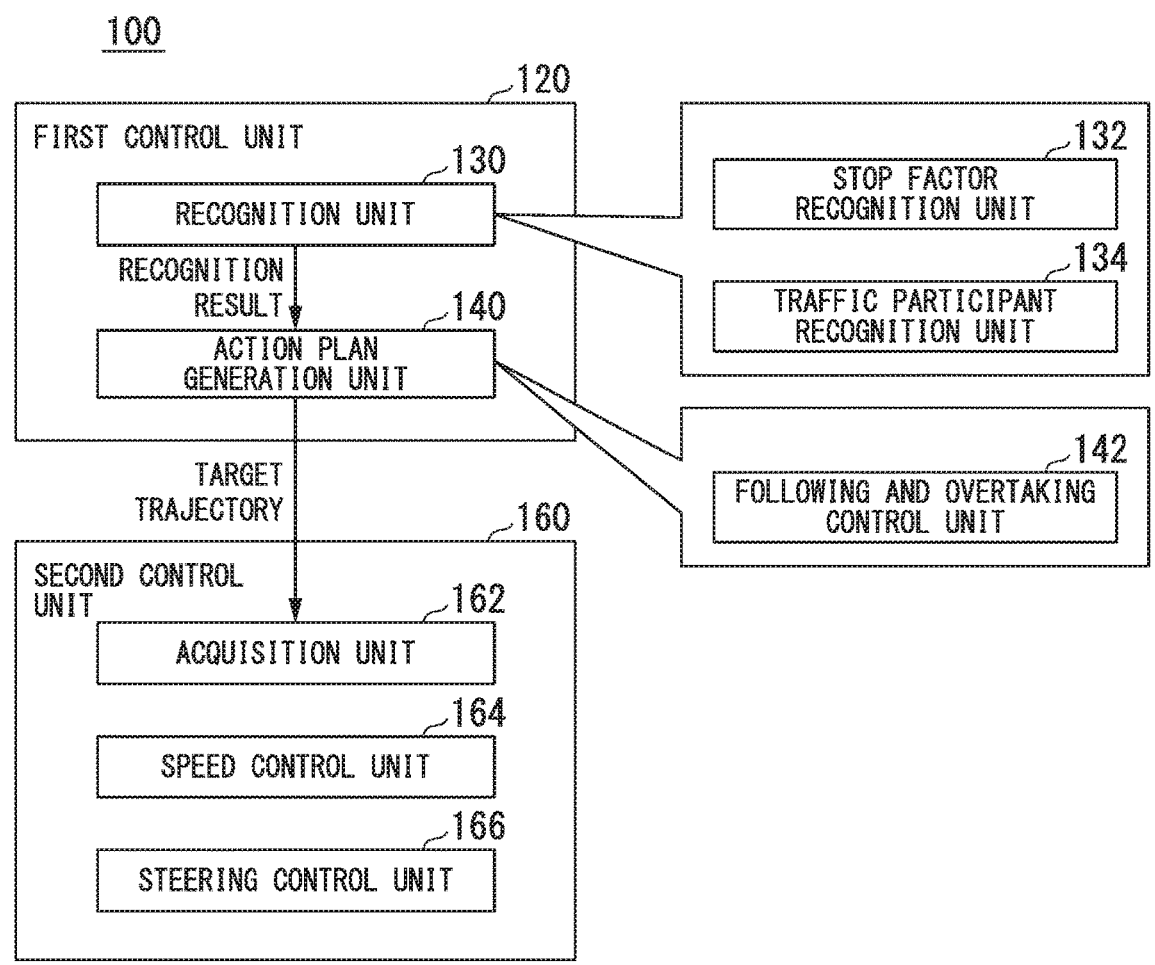
FIG. 2 is a diagram which shows an example of a functional configuration of a first control unit and a second control unit of the first embodiment.

FIG. 2 is a diagram which shows an example of a functional configuration of the first control unit 120 and the second control unit 160 of the first embodiment. The first control unit 120 includes, for example, a recognition unit 130, and an action plan generation unit 140. The first control unit 120 realizes, for example, a function of artificial intelligence (AI) and a function of a previously given model in parallel. For example, a function of "recognizing an intersection" may be realized by executing recognition of an intersection by deep learning or the like and recognition based on a previous given condition (including signals capable of allowing pattern matching, road signs, and the like) in parallel, and scoring both recognitions for comprehensive evaluation. As a result, reliability of automatic driving is guaranteed.

The recognition unit 130 recognizes a position, a speed, and a state such as an acceleration of an object in the vicinity of the host vehicle M on the basis of information input via the object recognition device 16 from the camera 10, the radar device 12 and the finder 14. The position of an object is, for example, recognized as a position in absolute coordinates with a representative point (a center of gravity, a driving axis center, or the like) of the host vehicle M as the origin, and is used for control. The position of an object may be represented by a representative point such as the center of gravity or a corner of the object, or may be represented by a represented region. The "state" of the object may include an acceleration, a jerk, or a "behavior state" (for example, whether or not lane change is being performed or is about to be performed) of the object.

The recognition unit 130 recognizes, for example, a lane (a traveling lane) on which the host vehicle M travels. For example, the recognition unit 130 may recognize a traveling lane by comparing a pattern (for example, an array of solid lines and broken lines) of road lane markers obtained from the second map information 62 and a pattern of a road lane marker in the vicinity of the host vehicle M recognized from an image captured by the camera 10. The recognition unit 130 may recognize a traveling lane by recognizing not only a road lane marker but also a lane boundary (road boundary) including a road lane marker, a road shoulder, a curb stone, a median strip, a guardrail, and the like. In this recognition, the position of the host vehicle M acquired from the navigation device 50 and a result of processing by INS may be added. The recognition unit 130 recognizes other vehicles, pedestrians, non-motorized vehicles, a stop position of a host vehicle including and pause lines, obstacles, red lights, toll booths, and other road events.

The recognition unit 130 recognizes the position and posture of the host vehicle M with respect to a traveling lane in a case that the traveling lane is recognized. The recognition unit 130 may recognize, for example, a deviation of the reference point of the host vehicle M from a lane center and an angle formed with respect to a line connecting the lane center in a traveling direction of the host vehicle M as a relative position and a posture of the host vehicle M with respect to the traveling lane. Instead of this, the recognition unit 130 may recognize a position and the like of a reference point of the host vehicle M with respect to either side end of the traveling lane (a road lane marker or a road boundary) as a relative position of the host vehicle M with respect to the traveling lane. The recognition unit 130 includes, for example, a stop factor recognition unit 132 and a traffic participant recognition unit 134 (see FIG. 2). Detailed configuration of the stop factor recognition unit 132 and the traffic participant recognition unit 134 will be described below.

The action plan generation unit 140 generates a target trajectory in which the host vehicle M will travel in the future (regardless of an operation of a driver) such that, in principle, the host vehicle M travels on a recommended lane determined by the recommended lane determination unit 61, and furthermore, can cope with circumstances thereof. A target trajectory includes, for example, a speed element. For example, a target trajectory is expressed as a sequence of points (trajectory points) to be reached by the host vehicle M. A trajectory point is a point to be reached by the host vehicle M for each predetermined traveling distance (for example, about several [m]) as a road distance. Apart from this, a target speed and target acceleration for each predetermined sampling time (for example, every several tenths of a [sec]) are generated as a part of the target trajectory. A trajectory point may also be a position to be reached by the host vehicle M at the sampling time for each predetermined sampling time. In this case, information on the target speed and the target acceleration are expressed by an interval between the trajectory points.

The action plan generation unit 140 may set an event of automatic driving in generation of a target trajectory. The event of automatic driving includes a constant speed traveling event, a low speed following traveling event, a lane change event, a branching event, a merging event, an overtaking event, and the like. The action plan generation unit 140 generates a target trajectory in accordance with an activated event.

The action plan generation unit 140 determines, for example, states of the traffic participant before the host vehicle M stops at a stop position on the basis of a result of the recognition by the recognition unit 130, and determines whether to overtake traffic participant on the basis of a result of the determination. The action plan generation unit 140 includes a following and overtaking control unit 142 (see FIG. 2). Detailed configuration of the following and overtaking control unit 142 will be described below.

The second control unit 160 controls the traveling driving force output device 200, the brake device 210, and the steering device 220 such that the host vehicle M passes through a target trajectory generated by the action plan generation unit 140 according to a scheduled time. The second control unit 160 automatically controls the acceleration or deceleration and steering of the host vehicle M on the basis of a surrounding situation recognized by the recognition unit 130. A combination of the action plan generation unit 140 and the second control unit 160 is an example of an operation control unit.

The second control unit 160 includes, for example, an acquisition unit 162, a speed control unit 164, and a steering control unit 166. The acquisition unit 162 acquires information on a target trajectory (a trajectory point) generated by the action plan generation unit 140, and causes it to be stored in a memory (not shown). The speed control unit 164 controls the traveling driving force output device 200 or the brake device 210 on the basis of a speed element associated with a target trajectory stored in a memory. The steering control unit 166 controls the steering device 220 according to the curvature of the target trajectory stored in a memory. Processing of the speed control unit 164 and the steering control unit 166 is realized, for example, by a combination of feedforward control and feedback control. As an example, the steering control unit 166 combines feedforward control in accordance with curvature of a road ahead of the host vehicle M and feedback control based on a deviation from the target trajectory, and executes it.

The traveling driving force output device 200 outputs a driving force (torque) for driving a vehicle to drive wheels. The traveling driving force output device 200 includes, for example, a combination of an internal combustion engine, an electric motor, a transmission, and the like, and an ECU that controls them. The ECU controls the above configuration according to information input from the second control unit 160 or information input from the driving operator 80.

The brake device 210 includes, for example, a brake caliper, a cylinder that transfers a hydraulic pressure to the brake caliper, an electric motor that causes the cylinder to generate a hydraulic pressure, and a brake ECU. The brake ECU controls an electric motor according to information input from the second control unit 160 or information input from the driving operator 80 such that brake torque associater with a braking operation is output to each wheel. The brake device 210 may include a mechanism for transferring a hydraulic pressure generated by an operation of a brake pedal included in the driving operator 80 to the cylinder via a master cylinder as a backup. The brake device 210 is not limited to the configuration described above, and may be an electronically controlled hydraulic pressure brake device that controls an actuator according to the information input from the second control unit 160, and transfers a hydraulic pressure of the master cylinder to the cylinder.

The steering device 220 includes, for example, a steering ECU and an electric motor. The electric motor changes a direction of a steering wheel by applying force to a rack and pinion mechanism, for example. The steering ECU drives the electric motor according to information input from the second control unit 160 and information input from the driving operator 80, and causes the direction of a steering wheel to be changed.

Overtaking and the Like of Traffic Participant

Hereinafter, processing in which the following and overtaking control unit 142 of the automatic driving control device 100 determines whether to cause the host vehicle M to perform overtaking and the like of the traffic participant will be described. The traffic participant refers to, for example, a moving object on a road whose relative speed is different from that of the host vehicle M by more than a certain amount. The traffic participant includes, for example, a pedestrian, a bicycle, a wheelchair, and the like.

In a case that the host vehicle M overtakes a traffic participant such as a pedestrian or a non-motorized vehicle in front of a stop position, the traffic participant to be overtaken may catch up with the host vehicle M while being stopped at a stop position. If the traffic participant comes before the host vehicle M at the stop position, the host vehicle M may need to overtake the traffic participant again.

Therefore, if the traffic participant is recognized in front of the stop position while the host vehicle M travels, depending on a situation, it is desirable to smooth traffic and to reduce influence on the traffic participant by following and traveling to the stop position without forcibly overtaking the traffic participant.

In the following description, overtaking is to proceed ahead of a proceeding object by changing a course of the host vehicle M, and passing is to proceed ahead of a proceeding object without changing the course of the host vehicle M. Hereinafter, "overtaking or passing" is appropriately described as "overtaking and the like", and "reaching a head of a traffic participant."

In a case that the host vehicle M is predicted to stop, the following and overtaking control unit 142 of the automatic driving control device 100 determines a future effect on the traffic participant recognized in front of the stop position on the basis of a surrounding situation of the host vehicle M, and determines whether to cause the host vehicle M to reach further ahead of the traffic participant in the traveling direction of the host vehicle M. First, various types of recognition processing for this determination processing will be described.

Stop Factor Recognition Unit

The stop factor recognition unit 132 recognizes a stop factor of the host vehicle M in the traveling direction of the host vehicle M on the basis of a result of recognizing the camera 10 or the like. A stop factor is an event that causes the host vehicle M to stop, and includes, for example, red lights, railroad crossings, temporary stops, congestion, stop vehicles, obstacles, construction sites, and the like.

Figure 3:
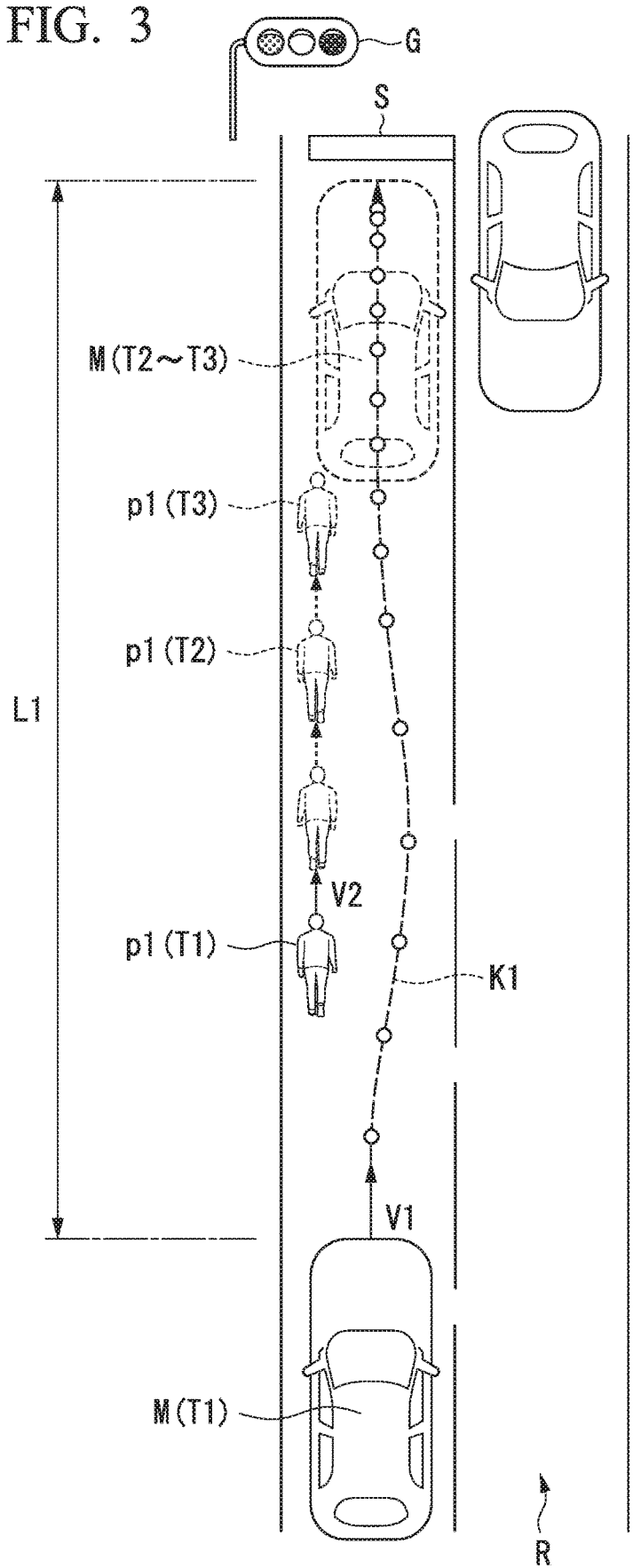
FIG. 3 is a diagram which shows an example of a state in which a host vehicle stops at a stop position.

FIG. 3 is a diagram which shows an example of a state in which the host vehicle M stops at a stop position. The stop factor recognition unit 132 recognizes display content (a display color or an indicated direction) of traffic lights G in the traveling direction of the host vehicle M as a stop factor, for example. In a case that the traffic lights G indicates content that instructs the host vehicle M to stop (for example, in a case that the traffic lights G is colored in red), the stop factor recognition unit 132 recognizes this situation as a stop factor. The stop factor recognition unit 132 recognizes a position and coloring of a display portion of the traffic lights G, for example, using the camera 10.

The stop factor recognition unit 132 extracts, for example, a road R and other objects from an image captured by the camera 10 or the like, extracts vehicles, obstacles, or the like stopped on the road R, and recognizes it as a stop factor. In a case that another vehicle m is stopped on the front side of the stop line S or in a case that a plurality of vehicles are stopped by congestion, the stop factor recognition unit 132 recognizes a position on a road surface of the road R that is separated from a rear end of another vehicle m at the end of a vehicle train to the front side by a predetermined distance as a stop position.

In addition, in a case that a stop factor such as an obstacles or a construction side is recognized, the stop factor recognition unit 132 recognizes a position on the road surface of the road R that is separated from the object recognized as a stop factor to the front side by a predetermined distance as a stop position.

The stop factor recognition unit 132 may predict future display content of the traffic lights G, and recognize a state in which it is predicted that a stop instruction is made by the traffic lights G as a stop factor at a time at which the host vehicle M is expected to reach a stop position at which the host vehicle needs to stop according to the stop instruction of the traffic lights G. Hereinafter, stop factor patterns (1) to (5) will be described.

(1) In a case that it is recognized that the display content of traffic lights changes for one cycle of blue to red to blue, the stop factor recognition unit 132, for example, may recognize time required for one cycle and predict a timing and a period at which the stop instruction is made by the traffic lights G.

(2) The stop factor recognition unit 132 may recognize a change of the display content of traffic lights for pedestrians and a change of the display content of traffic lights of a road crossing the road R on which the host vehicle M travels, and predict a future change of the display of the traffic lights G For example, in a case that the display content of traffic lights for pedestrians in the same direction as the traveling direction of the host vehicle M, which is installed in the vicinity of the traffic lights G for vehicles of the road R indicates a stop instruction, the stop factor recognition unit 132 may predict that the traffic lights G will switch to a stop instruction soon.

In a case that it is recognized that a considerate amount of time has elapsed since the display content of traffic lights of a road crossing the road R indicates a stop instruction, the stop factor recognition unit 132 may predict that the display content of the traffic lights G switches from the stop instruction to proceeding permission.

(3) In a case that the traffic lights G has a communication function, the stop factor recognition unit 132 may acquire information indicating "red light in * seconds" and predict that a stop instruction is made by the traffic lights G The stop factor recognition unit 132 recognizes, for example, the display content of the traffic lights G on the basis of scheduled information of the display content displayed on the traffic lights G acquired via the communication device 20**.

(4) In addition, the stop factor recognition unit 132 may store a display pattern (a switching interval) of the traffic lights G recognized in the past traveling in association with the position, and predict a display of the future traffic lights G by learning based on stored data.

(5) In addition to a display content of the traffic lights G, the stop factor recognition unit 132 may also recognize a case in which a temporary stop position is recognized, or a case in which a plurality of stop vehicles forming a row on a lane of a road and stopping due to congestion or the like are recognized as a stop factor.

The stop factor recognition unit 132 recognizes a stop position on a road surface of the road R at which the host vehicle M needs to stop in a case that a stop factor is recognized. The stop factor recognition unit 132 recognizes, for example, a stop line S marked on the road surface of the road R as a stop position. The stop factor recognition unit 132 extracts, for example, a white line on the road surface on the basis of contrast of an image of the road R captured by the camera 10 or the like. The stop factor recognition unit 132 recognizes the stop line S on the basis of a position and a direction of the white line. The stop factor recognition unit 132 recognizes a position which is separated from the stop line S to the front side by a predetermined distance as a stop position.

The stop factor recognition unit 132 may estimate time at which a stop factor is canceled after recognizing the stop factor. The fact that the stop factor is canceled is that the host vehicle M is changed from a stopped state to a startable state. For example, the startable state refers to a state in which, after the display content of the traffic light G turns to green light, the host vehicle M can start or a state in which the host vehicle M can start after another vehicle stopped ahead of the host vehicle M starts.

For this estimation, the stop factor recognition unit 132 recognizes a distance to the stop position, and estimates a time T2 at which the host vehicle M arrives at the stop position from a current position thereof on the basis of a current time T1, the distance to the stop position, and the speed of the host vehicle M (or a speed of a traffic flow).

Then, the stop factor recognition unit 132 estimates, for example, a time T3 at which a stop factor is canceled on the basis of a display time of the traffic lights. For example, in a case that the host vehicle is stopped in front of the stop line S, the stop factor recognition unit 132 estimates a time at which the display of the traffic lights G changes from red light to green light as a time T3. In a case that the host vehicle M is stopped in the middle of (not at the beginning) the vehicle train stopped in front of the stop line S, after the display of the traffic lights is changed from red light to green light, the stop factor recognition unit 132 estimates a time at which a vehicle ahead of the host vehicle M starts as a time T3 on the basis of a propagation time of starting of each of a plurality of vehicles being stopped ahead of the host vehicle M.

In a case that a temporary stop position is recognized, the stop factor recognition unit 132 estimates the time T2 at which the host vehicle M arrives at the stop position from a current position thereof, and estimates the time T3 at which the host vehicle M starts from a temporary stop position after a predetermined time (for example, about several [sec]) during a temporary stop at the time T2.

For example, in a case that vehicles stopped due to congestion are recognized, the stop factor recognition unit 132 estimates a time T2 at which the host vehicle M arrives at a stop position of the front side from a rear end of the last vehicle stopped from a current position of the host vehicle M, estimates that it moves a speed of a traffic flow in a congestion section after time T2, and appropriately estimates the position and time after the time T2. A speed of the traffic flow in a congestion section is set on the basis of, for example, traffic information acquired from the network. The stop factor recognition unit 132 outputs a result of the recognition and a result of the estimation to the following and overtaking control unit 142.

Traffic Participant Recognition Unit

The traffic participant recognition unit 134 recognizes a traffic participant moving in the traveling direction of the host vehicle M at a speed lower than the speed of the host vehicle M on a road of the front side of the stop position on the basis of a result of the recognition by the camera 10 or the like. The traffic participant recognition unit 134, for example, extracts a moving object on the road R from a plurality of images and the like captured by the camera 10, and recognizes the traffic participant among moving objects on the basis of a position and a moving direction of the moving objects.

The traffic participant recognition unit 134 recognizes relative speeds and relative positions of the host vehicle M and a traffic participant on the basis of a plurality of images and the like captured by the camera 10. The traffic participant recognition unit 134 outputs a result of the recognition to the following and overtaking control unit 142.

Following and Overtaking Control Unit

The following and overtaking control unit 142 performs control for causing the host vehicle M to reach further ahead of a traffic participant recognized by the traffic participant recognition unit 134, or to follow the traffic participant. In a case that a stop position of the host vehicle M is recognized by the recognition unit 130 in the traveling direction of the vehicle and a traffic participant proceeding at a speed lower than the speed of the vehicle in the same direction as the traveling direction of the vehicle is recognized, the following and overtaking control unit 142 determines whether the host vehicle M catches up with the traffic participant before it stops at the stop position.

For example, the following and overtaking control unit 142, as shown in Equation (1), calculates a time t0 at which the host vehicle M catches up with the traffic participant by dividing a relative position d of the traffic participant with respect to the host vehicle M by a relative speed v.

$$t0 = d/v \ldots \quad (1)$$

Next, the following and overtaking control unit 142, as shown in Equation (2), calculates a time t1 until the host vehicle M reaches a stop position by subtracting a current time T1 from the time T2 at which the host vehicle M arrives at a stop position.

Then, the following and overtaking control unit 142 compares t0 with t1, and, in a case that t0 is less than t1, it is determined that the host vehicle M catches up with the traffic participant before the host vehicle M stops at the stop position.

In a case that it is determined that the host vehicle M catches up with the traffic participant before the host vehicle M stops at the stop position, if the host vehicle M is caused to overtake the traffic participant, the following and overtaking control unit 142 determines whether the traffic participant catches up with the host vehicle while the host vehicle M stops at the stop position.

The following and overtaking control unit 142 estimates, for example, a future position of the traffic participant. In the example of FIG. 3, the following and overtaking control unit 142 calculates a position of a pedestrian p1 at a current time T1 on the basis of the relative positions of the host vehicle M and the traffic participant (the pedestrian p1) recognized by the traffic participant recognition unit 134. The following and overtaking control unit 142 calculates a speed V2 (vector) of the pedestrian p1 on the basis of the relative speeds (vectors) of the host vehicle M and the pedestrian p1 recognized by the traffic participant recognition unit 134 and a speed vector of the host vehicle M, and estimates a future position of the pedestrian p1 on the basis of a value obtained by integrating the calculated speed V2 with time.

In a case that it is estimated that the position of the traffic participant does not reach the stop position until the time T3 at which a stop factor is canceled, even if the traffic participant is overtaken, the following and overtaking control unit 142 determines that the traffic participant does not catch up with the host vehicle M. On the other hand, in a case that it is estimated that the position of the traffic participant reaches the stop position until the time T3 at which a stop factor is canceled, if the traffic participant is overtaken or the like, the following and overtaking control unit 142 determines that the traffic participant catches up with the host vehicle M.

In a case that it is determined that the traffic participant catches up with the host vehicle M, the following and overtaking control unit 142 evaluates the risk occurring in the traffic participant at the stop position and usefulness of overtaking (hereinafter, an effect on the traffic participant) in a case that the host vehicle M overtakes or the like the traffic participant. A result of evaluation of an effect on the traffic participant may be represented, for example, in high and low binary values, and may also be represented by consecutive numerical values. Hereinafter, an example of evaluating the effect on the traffic participant in binary values will be shown.

The risk occurring in the traffic participant is, for example, evaluated on the basis of whether a predicted surrounding situation of the host vehicle M satisfies the first condition. The first condition includes, for example, (A) that the host vehicle M does not obstruct the passage of the traffic participant, and (B) that a road width is not narrow. A state in which the passage of the traffic participant of (A) is not obstructed is a state in which the host vehicle M can travel without giving an effect on proceeding of the traffic participant. A fact that the road of (B) is not narrow refers to that the road width is wide enough to allow the host vehicle M to travel without giving an effect on the traffic participant in a case that the host vehicle overtakes the traffic participant, and the like.

For example, in a case that the first condition is fully satisfied, the following and overtaking control unit 142 determines that a risk is low, and determines to cause the host vehicle M to overtake the traffic participant. Conversely, in a case that at least a part of the first condition is not satisfied, the following and overtaking control unit 142 determines that a risk is high and determines to cause the host vehicle M to follow the traffic participant.

In addition to the first condition, usefulness of the host vehicle M overtaking the traffic participant, and the like are evaluated by whether a second condition is satisfied. The second condition includes, for example, that (C) a distance between a position at which the host vehicle M catches up with the traffic participant and the stop position is a predetermined distance or more, and (D) the following time in a case in which the traffic participant is not overtaken and the like are predicted to be long.

For example, in a case that at least a part of the second condition is satisfied, the following and overtaking control unit 142 determines that the host vehicle M does not obstruct the passage of the traffic participant, and determines to cause the host vehicle M to overtake the traffic participant and the like. Conversely, in a case that the second condition is not satisfied, the following and overtaking control unit 142 determines that the host vehicle M obstructs the passage of the traffic participant and determines to cause the host vehicle M to follow the traffic participant.

Figure 4:
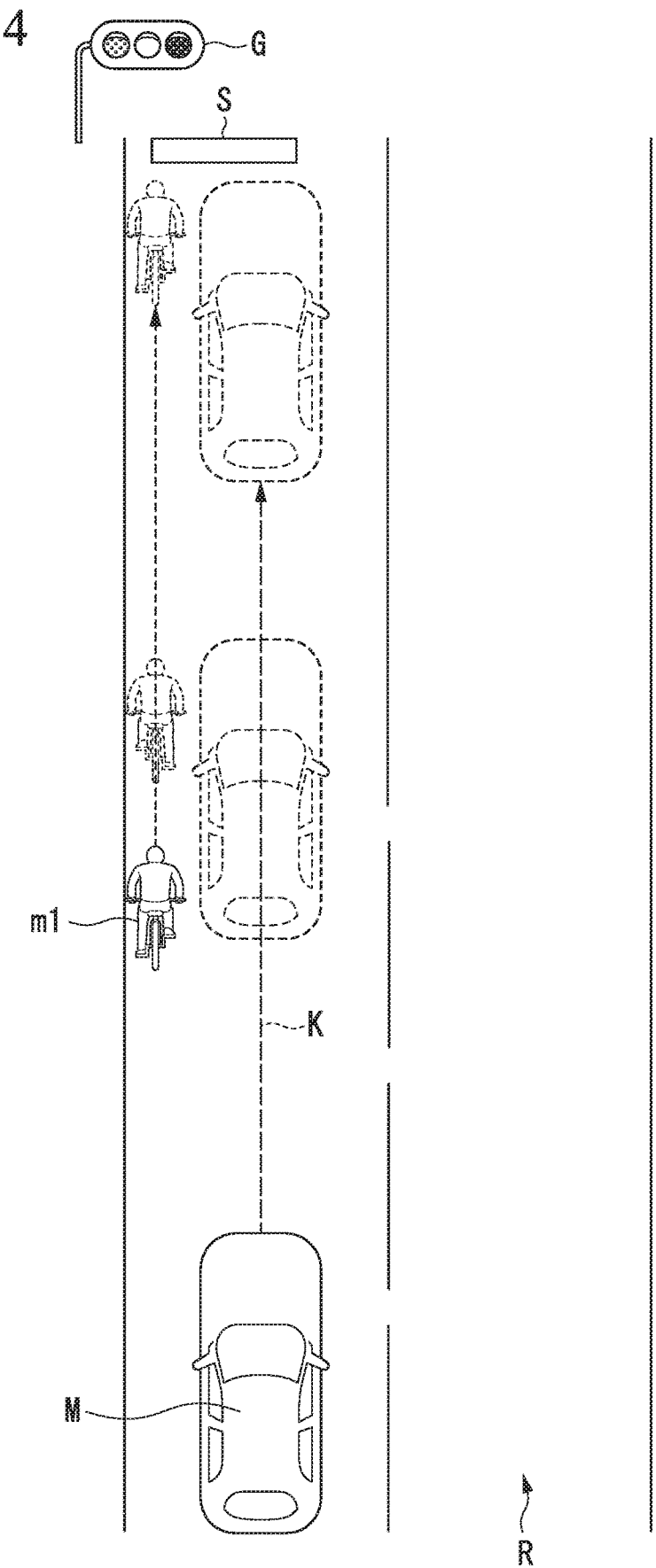
FIG. 4 is a diagram which shows an example of a state in which a host vehicle does not obstruct passage of traffic participant.

Hereinafter, a determination example of the first condition will be described. FIG. 4 is a diagram which shows an example of a state in which the host vehicle M does not obstruct a passage of a traffic participant. For example, in a case that a condition is recognized as the first condition in which the host vehicle M does not obstruct the passage of a traffic participant (a bicycle m1 in the example of FIG. 4), the following and overtaking control unit 142 determines that there is a low risk occurring in the traffic participant, and determines to cause the host vehicle M to overtake the traffic participant.

In the example of FIG. 4, a state in which a width of the road R on which the host vehicle M travels is equal to or greater than a predetermined distance between the bicycle m1 and the host vehicle M in a transverse direction of the road R is shown. In this case, even if the host vehicle M is caught up with by the bicycle m1 while being stopped at the stop position, since the traffic participant can move without obstruction of the passage regardless of the position of the host vehicle M, it is evaluated that the first condition (1) is satisfied and a risk occurring in the bicycle m1 is low.

The following and overtaking control unit 142 travels along, for example, a target trajectory K, and instructs the second control unit 160 to cause the host vehicle M to overtake the bicycle m1 while opening an interval between the bicycle m1 and the side surface of the host vehicle M to a predetermined value or more. However, in a case that there is a reference stipulated by traffic regulations even if the condition described above is conformed, the following and overtaking control unit 142 determines to cause the host vehicle M to travel according to traffic regulations (the same hereinafter).

Figure 5:
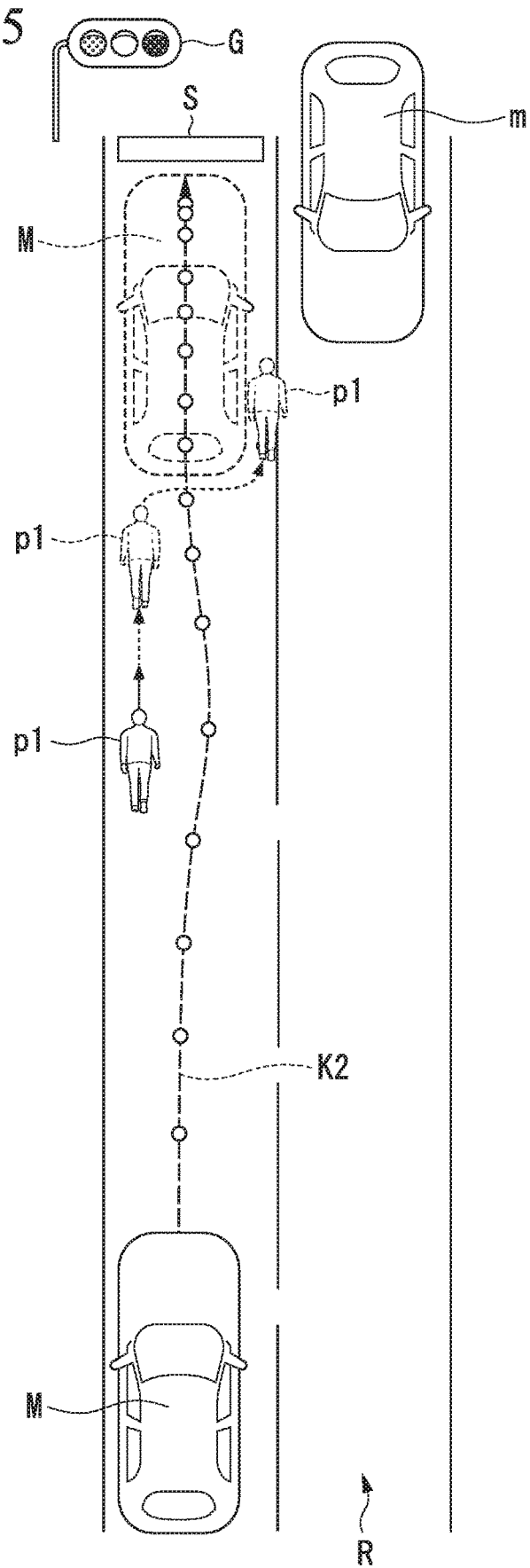
FIG. 5 is a diagram which shows an example of a state in which a road width is narrow.

FIG. 5 is a diagram which shows an example of a state in which the width of the road R is narrow. In a case that the width of the road R is narrow, the following and overtaking control unit 142 determines that the first condition (2) is not satisfied, and the risk occurring in the traffic participant is high, and determines to cause the host vehicle M to follow the traffic participant.

In the narrow road R, it is assumed that the host vehicle M overtakes the traffic participant in front of the stop position and stops at the stop position. If the host vehicle M stops at the stop position, there is a case in which a width for a passage of the traffic participant is not secured on a left side of the host vehicle M being stopped. In this state, if the traffic participant catches up with the host vehicle M being stopped, the traffic participant (for example, a pedestrian p1) overtakes the host vehicle M from a right side of the host vehicle M through a backside of the host vehicle M, and thereby there is a possibility that a risk approaching an oncoming vehicle may occur in the pedestrian p1. Therefore, in a case that the width of the road R is narrow, it is evaluated that the first condition (2) is not satisfied and the risk occurring in the pedestrian p1 is high.

Hereinafter, a determination method of the second condition will be described. In a case that a distance between a position at which the host vehicle M catches up with the traffic participant and the stop position is a predetermined distance or more by the stop factor recognition unit 132, the following and overtaking control unit 142 determines that the second condition (3) is satisfied and the usefulness of the host vehicle M overtaking the traffic participant, and the like are high and determines to cause the host vehicle M to perform overtaking and the like on the traffic participant on the basis of a result of the determination.

In a case that the distance between a position at which the host vehicle M catches up with the traffic participant and the stop position is a predetermined distance or more, if the host vehicle M continues to follow the traffic participant for a long distance to the stop position, there is a possibility of giving a sense of discomfort to the traffic participant which is being followed. Therefore, it is unnatural that the host vehicle M continues to follow the traffic participant, and thus, in a case that the distance between a position at which the host vehicle M catches up with the traffic participant and the stop position is a predetermined distance or more, it is evaluated that the usefulness of the host vehicle M overtaking the traffic participant, and the like are high. The position at which the host vehicle M catches up with the traffic participant is, for example, a position at which a distance between the host vehicle M and the traffic participant is equal to or less than a predetermined value. A predetermined distance from the stop position may be, for example, predetermined, or may be determined according to the relative speed of the traffic participant.

In a case that the following time in a case in which the traffic participant is not overtaken and the like is long, the following and overtaking control unit 142 determines that the second condition (4) is satisfied and the usefulness of the host vehicle M overtaking the traffic participant, and the like are high, and determines to cause the host vehicle M to overtake the traffic participant and the like on the basis of a result of the determination.

The following and overtaking control unit 142, for example, assumes that the host vehicle M has followed the traffic participant in an interval between the first position at which the host vehicle M catches up with the traffic participant and the stop position on the basis of a moving speed of the traffic participant, and calculates time required for the following of the traffic participant.

If the host vehicle M continues to follow the traffic participant at a low speed for a long time, there is a possibility of giving a sense of discomfort to the traffic participant. Accordingly, it is unnatural that the host vehicle M continues to follow the traffic participant, and thus, in a case that it is predicted that the following time in a case in which the traffic participant is not overtaken and the like are long, it is evaluated that the usefulness of the host vehicle M overtaking the traffic participant, and the like are high.

Processing Flow

Figure 6:
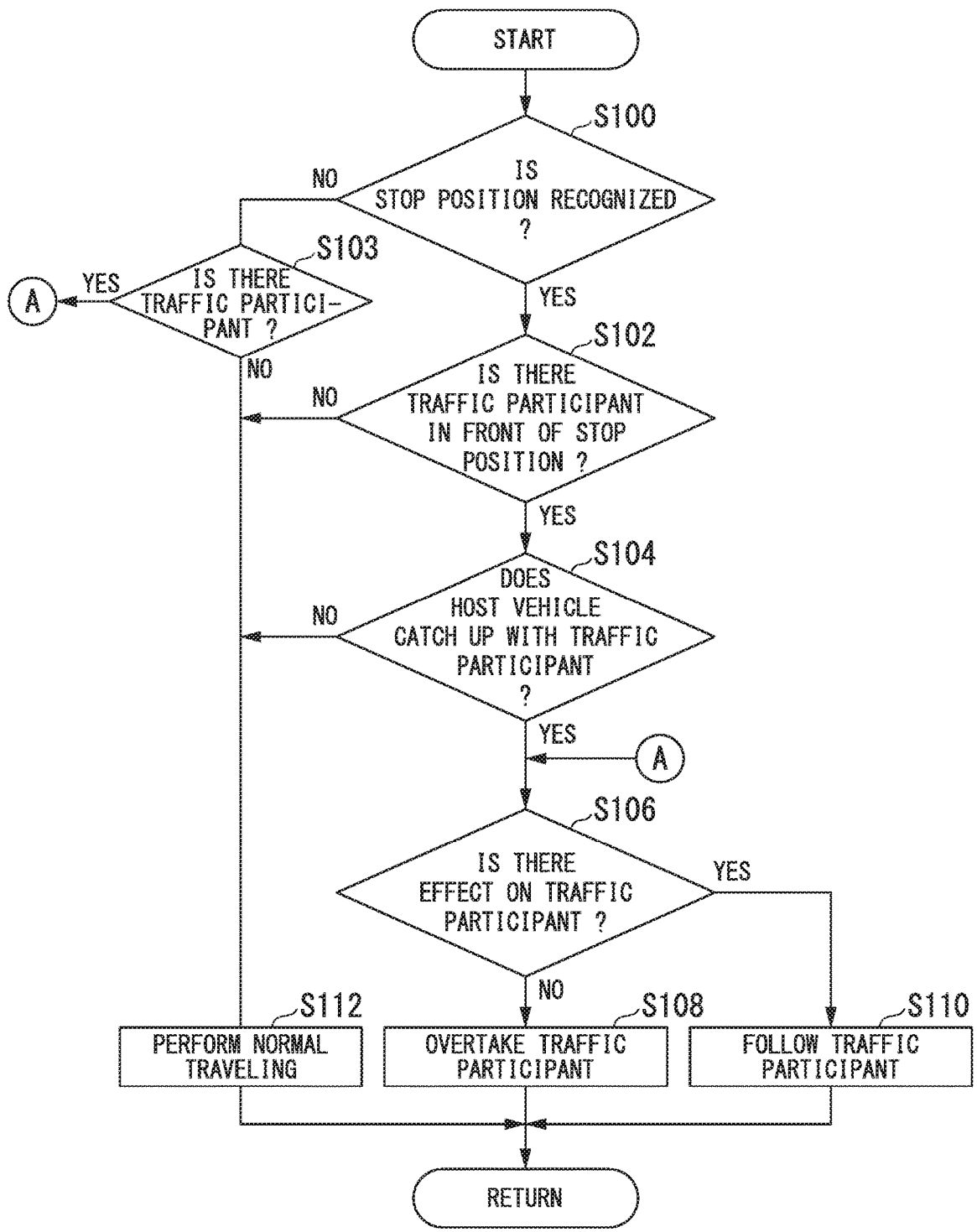
FIG. 6 is a flowchart which shows an example of a flow of processing executed in an automatic driving control device.

Next, processing executed in the automatic driving control device 100 will be descried. FIG. 6 is a flowchart which shows an example of a flow of the processing executed in the automatic driving control device 100.

The stop factor recognition unit 132 determines whether there is a stop position in the traveling direction of the host vehicle M (step S100). In a case that a positive determination is obtained in step S100, the traffic participant recognition unit 134 determines whether there is a traffic participant proceeding at a speed lower than the speed of the host vehicle M in the traveling direction of the host vehicle M in front of the stop position of the host vehicle M (step S102). In a case that a positive determination is obtained in step S102, the following and overtaking control unit 142 determines whether the host vehicle M catches up with the traffic participant while the host vehicle M arrives at the stop position (step S104).

In a case that a positive determination is obtained in step S104, the following and overtaking control unit 142 determines whether to give an effect on the traffic participant in a case that it is assumed that the host vehicle M has overtaken the traffic participant (step S106). In a case that a negative determination is obtained in step S106, the following and overtaking control unit 142 determines to cause the host vehicle M to overtake the traffic participant (step S108). In a case that a positive determination is obtained in step S106, the following and overtaking control unit 142 determines to cause the host vehicle M to follow the traffic participant (step S110).

After the processing of step S108 or step S110 is executed, the automatic driving control device 100 ends processing of the flowchart. In a case that a negative determination is obtained in step S100, the traffic participant recognition unit 134 determines whether there is a traffic participant proceeding at a speed lower than the speed of the host vehicle M in the traveling direction of the host vehicle M (step S103). In a case that a negative determination is obtained in step S103, the processing proceeds to step S112. In a case that a positive determination is obtained in step S103, the processing proceeds to step S106. In a case that the following and overtaking control unit 142 obtains a negative determination in step S102 and step S104, the automatic driving control device 100 determines to cause the host vehicle M to perform normal traveling (step S112), and ends processing of the flowchart. Here, normal traveling is, for example, traveling in accordance with traffic regulations and a traffic flow.

According to the first embodiment as described above, the automatic driving control device 100 can reduce an effect on a traffic participant recognized on the front side of the stop position. As a result, the automatic driving control device 100 can make traffic smooth.

Second Embodiment

The automatic driving control device 100 in the first embodiment determines a risk and the like occurring in a traffic participant recognized in front of the stop position, and determines whether to cause the host vehicle to overtake the traffic participant. An automatic driving control device 100A in a second embodiment adds attributes of a traffic participant to a basis of determination, and changes control of the host vehicle in front of the stop position in accordance with the attributes of the traffic participant in determination of effect on traffic participants. In the following description, the same constituents as in the first embodiment will be denoted by the same names and numeral numbers, and duplicated description will be appropriately omitted.

Figure 7:
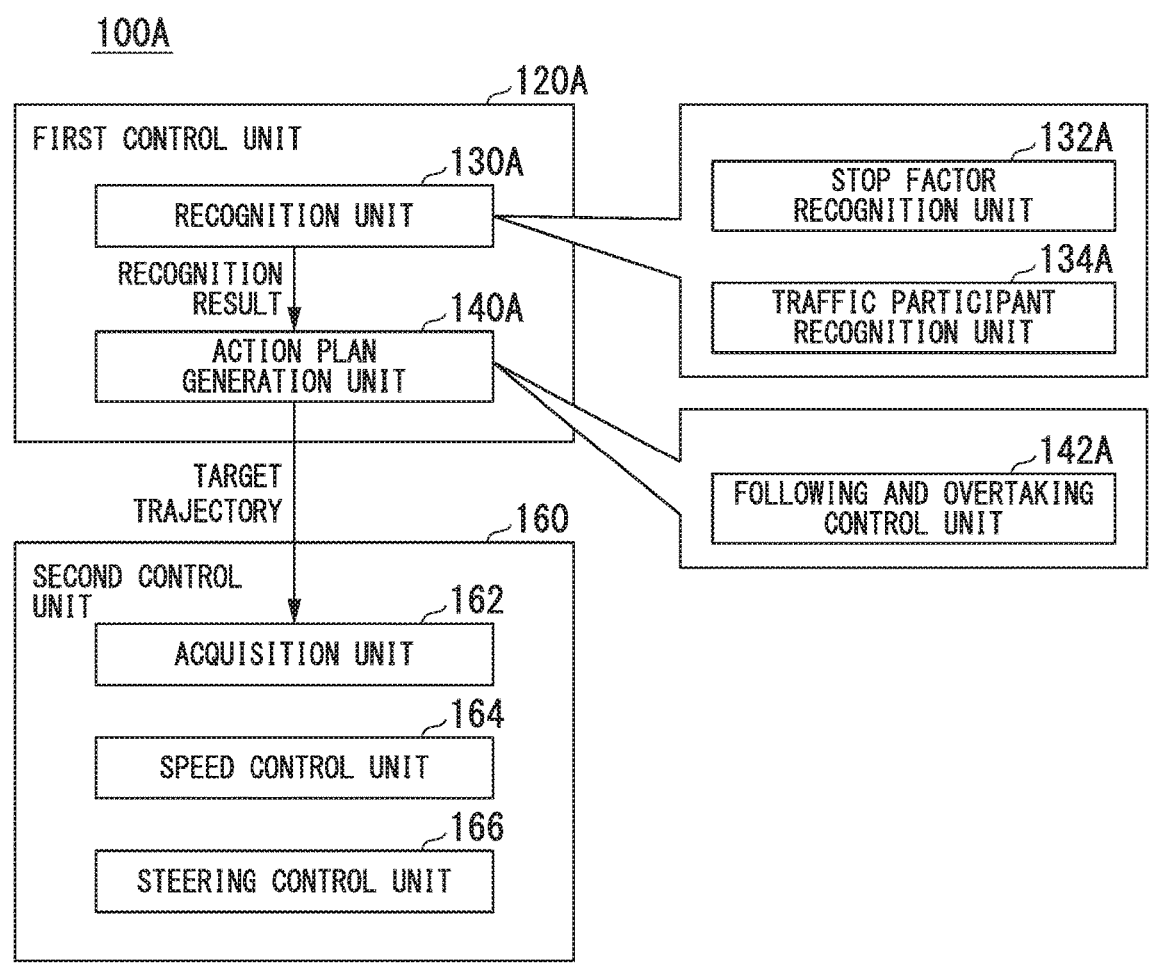
FIG. 7 is a diagram which shows an example of a functional configuration of an automatic driving control device according to a second embodiment.

FIG. 7 is a diagram which shows an example of a functional configuration of the automatic driving control device 100A of the second embodiment. The automatic driving control device 100A includes a first control unit 120A and a second control unit 160. In the first control unit 120A, a traffic participant recognition unit 134A also recognizes attributes of the traffic participant in addition to the function thereof in the first embodiment. In processing of recognizing a pedestrian, the traffic participant recognition unit 134A, for example, analyzes an image captured by the camera 10 or the like, estimates a height, a physique, and the like of a pedestrian, and separately recognizes whether the pedestrian is an adult or a child.

In processing of recognizing a non-motorized vehicle, the traffic participant recognition unit 134A may analyze an image captured by the camera 10 or the like, estimate the height, the physique, and the like of a driver of the non-motorized vehicle, and separately recognize whether the driver of the non-motorized vehicle is an adult or a child. In the processing of recognizing a non-motorized vehicle, the traffic participant recognition unit 134A may analyze an image captured by the camera 10 or the like, and recognizes a vehicle type of the non-motorized vehicle. The vehicle type of the non-motorized vehicle is, for example, a bicycle, a wheelchair, a rear car, a rickshaw, and the like. A non-electric vehicle may be a bicycle or the like assisted by an electric motor.

In a case that it is assumed that the host vehicle M has overtaken a traffic participant recognized in front of the stop position on the basis of a recognition result of the stop factor recognition unit 132 and the traffic participant recognition unit 134A, the following and overtaking control unit 142A determines an effect on the traffic participant in accordance with the attributes of the traffic participant. For example, in a case that the traffic participant is recognized as a child, the following overtaking control unit 142A determines that the effect on the traffic participant is higher than in the case of an adult.

Then, the following and overtaking control unit 142A determines whether to cause the host vehicle to overtake the traffic participant on the basis of a result of the determination. In a case in which the following and overtaking control unit 142A determines that an effect on the traffic participant is high, and a child is recognized, in a case that the host vehicle M is caused to perform overtaking and the like, a distance between the traffic participant and the host vehicle M is set to be longer than in a case of an adult.

Processing Flow

Figure 8:
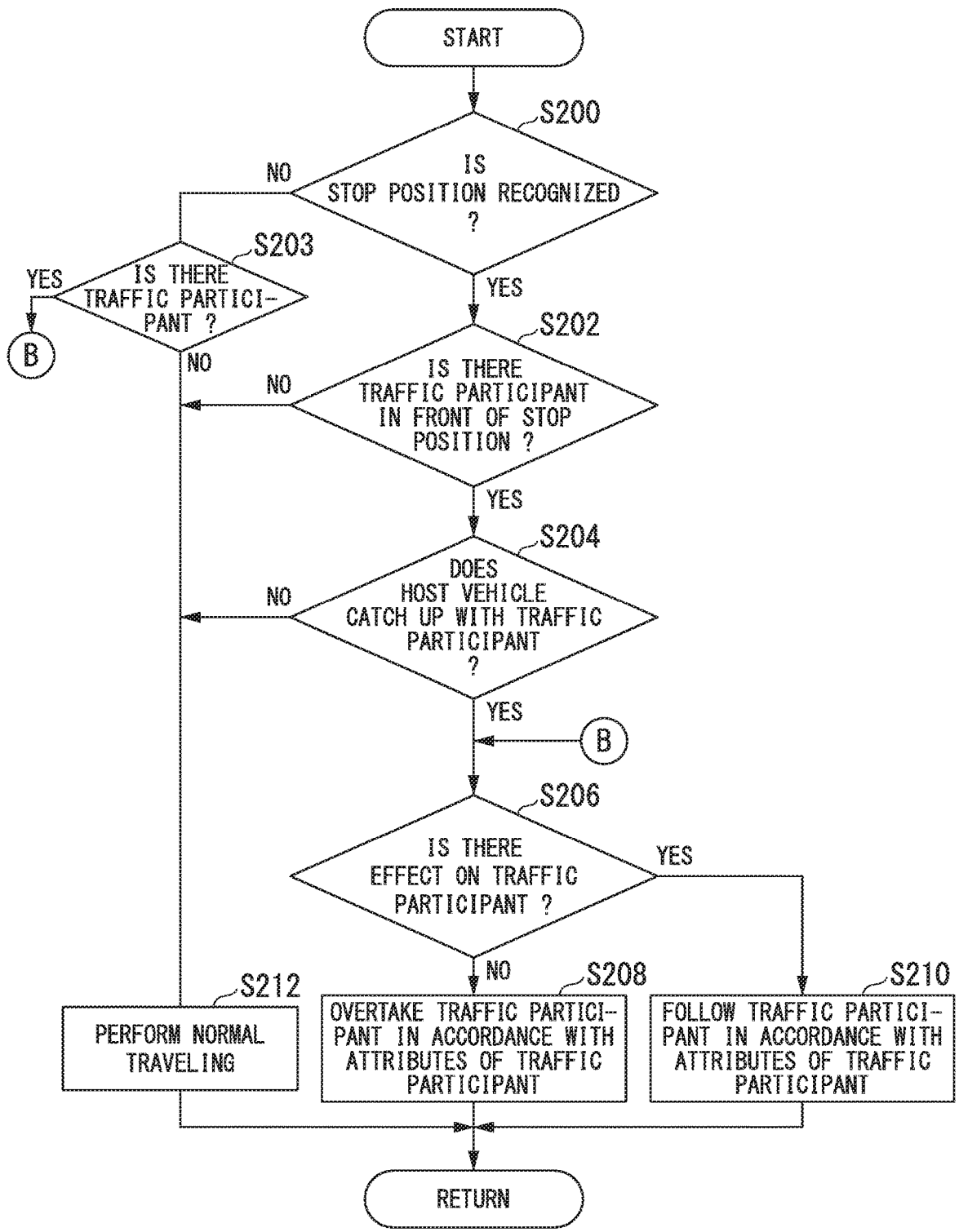
FIG. 8 is a flowchart which shows an example of a flow of processing executed in the automatic driving control device.

Next, a flow of processing executed in the automatic driving control device 100A will be described. FIG. 8 is a flowchart which shows an example of the flow of processing executed in the automatic driving control device 100A. Processing of step S200, step S203, step S204, and step S212 is the same as processing of step S100 and step S104 of the first embodiment. Hereinafter, processing which is different from in the first embodiment will be described.

The traffic participant recognition unit 134A determines whether there is a traffic participant proceeding at a speed lower than the speed of the host vehicle M in the traveling direction of the host vehicle M in front of the stop position of the host vehicle M (step S202). At this time, the traffic participant recognition unit 134A recognizes the attributes of the traffic participant in the recognition of the traffic participant.

Next, processing executed in step S206 will be described. In a case that it is determined that the host vehicle M catches up with the traffic participant while arriving at the stop position in step S204, the following and overtaking control unit 142 determines whether to give an effect on the traffic participant in a case that it is assumed that the host vehicle M has overtaken the traffic participant on the basis of the attributes of the traffic participant (step S206). In a case that it is determined not to give an effect on the traffic participant in step S206, the following and overtaking control unit 142 determines to cause the host vehicle M to overtake the traffic participant according to the attributes of the traffic participant (step S208).

In a case that it is determined to give an effect on a traffic participant in step S206, the following and overtaking control unit 142A determines to cause the host vehicle M to catch up with the traffic participant according to the attributes of the traffic participant (step S210).

According to the second embodiment as described above, the automatic driving control device 100A can prevent the host vehicle M from approaching the traffic participant and reduce an effect on the traffic participant by adding, at the time of determining an effect generated on the traffic participant, the attributes of the traffic participant to the basis of determination.

Third Embodiment

According to the first and second embodiments, the effect on the traffic participant is determined according to a sur- rounding situation of the host vehicle M, and it is determined whether to cause the host vehicle M to perform overtaking and the like. In a third embodiment, the effect on the traffic participant is turned into cost and evaluated. In the following description, the same constituents as in the first embodiment will be denoted by the same names and numerals, and duplicated description will be appropriately omitted.

Figure 9:
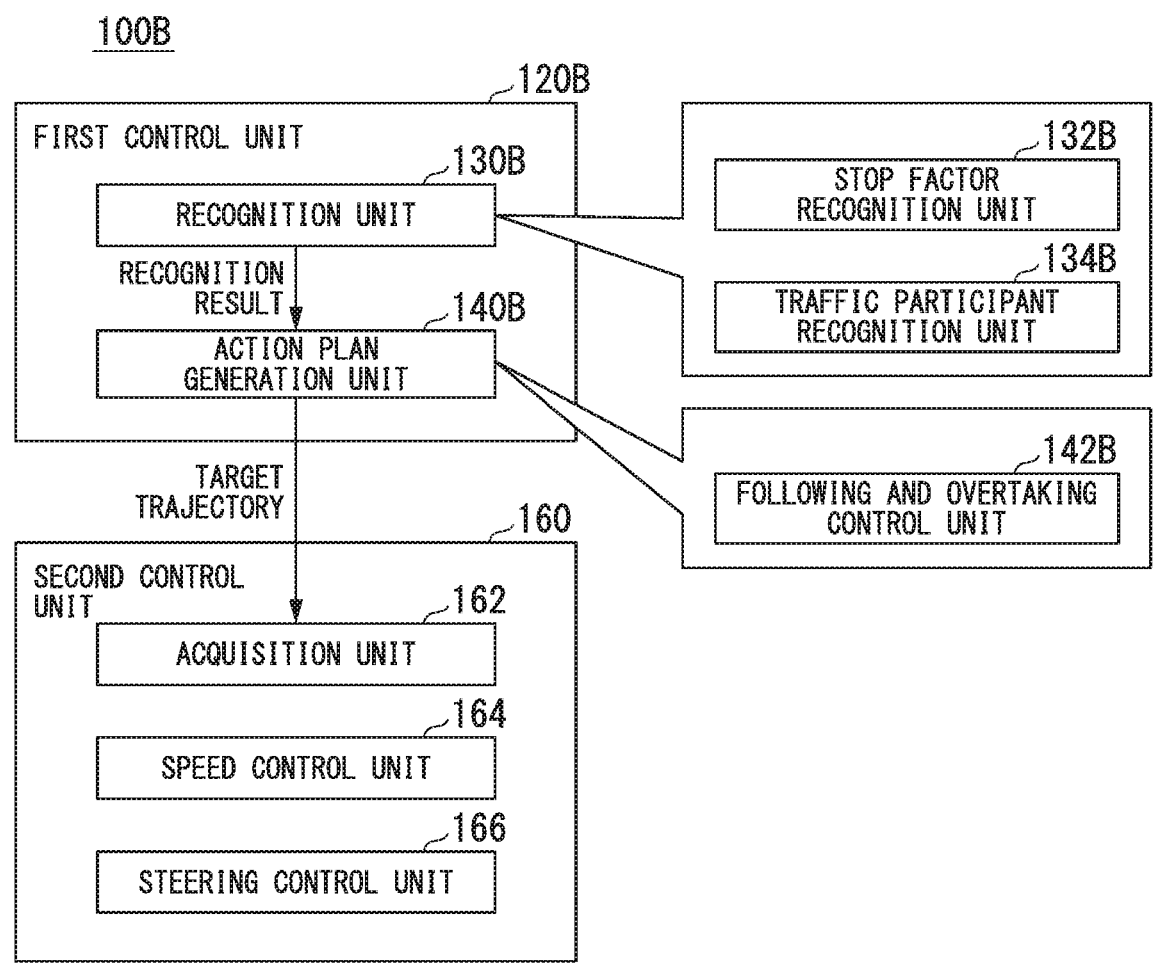
FIG. 9 is a diagram which shows an example of a functional configuration of an automatic driving control device according to a third embodiment.

FIG. 9 is a diagram which shows an example of a functional configuration of an automatic driving control device 100B of the third embodiment. The automatic driving control device 100B includes a first control unit 120B and a second control unit 160. In the first control unit 120B, the following and overtaking control unit 142B turns the effect on the traffic participant into cost, and determines whether to cause the host vehicle M to overtake and the like traffic participants according to the cost in a case that it is determined that the host vehicle M catches up with the traffic participant before the host vehicle M reaches the stop position on the basis of a result of recognition by the stop factor recognition unit 132B and the traffic participant recognition unit 134B.

The following and overtaking control unit 142B turns each of a plurality of elements included in the effect factor given on the traffic participant into cost, for example. The cost may be a positive value or a negative value.

An element related to a road includes, for example, a road width, the number of lanes, a distance to the stop position, a degree of congestion based on the number of other vehicles, an average speed of vehicles on a road, and the like. An element related to a traffic participant includes, for example, an adult, a child, a type of a non-motorized vehicle, a driver of the non-motorized vehicle, a relative speed to the host vehicle M, and a relative distance to the host vehicle M. A risk element related to a stop factor includes a distance to the stop position, a follow-up time in a case of not overtaking the traffic participant, and the like, a stop time, a signal display, congestion, a temporary stop, a construction site, an obstacle, and the like.

The following and overtaking control unit 142B, for example, gives cost to each element according to a height of the effect on the traffic participant. The following and overtaking control unit 142B, for example, causes the cost for a child to increase more than for an adult with respect to an element of the effect on the traffic participants. The following and overtaking control unit 142B causes the cost to increase as much as the road width becomes equal to or less than a predetermined width with respect to an element related to a road, for example. The predetermined width is a width in the transverse direction of a road on which a sufficient distance that the traffic participant can pass through between the host vehicle M and the traffic participant can be secured at the time of overtaking traffic participants, and the like. The following and overtaking control unit 142B, for example, causes the cost to increase as much as the distance to the stop position is shorter with respect to an element related to a stop factor.

At this time, in a case that it is evaluated that a risk occurring in the traffic participant according to a correlation of different elements is high, the following and overtaking control unit 142B may give weight to the cost. The following and overtaking control unit 142B may compare a threshold value set for each element and the cost of each element and evaluate the effect on the traffic participant for each element.

The following and overtaking control unit 142B compares total cost which is a sum of cost of a plurality of cost elements with a threshold value, and evaluates the effect on the traffic participant, for example. For example, in a case that the cost is less than a predetermined threshold value, the following and the overtaking control unit 142B determines to cause the host vehicle M to overtake the traffic participant. The following and overtaking control unit 142B determines to cause the host vehicle M to follow the traffic participant in a case that the cost is equal to or greater than the predetermined threshold value.

Processing Flow

Figure 10:
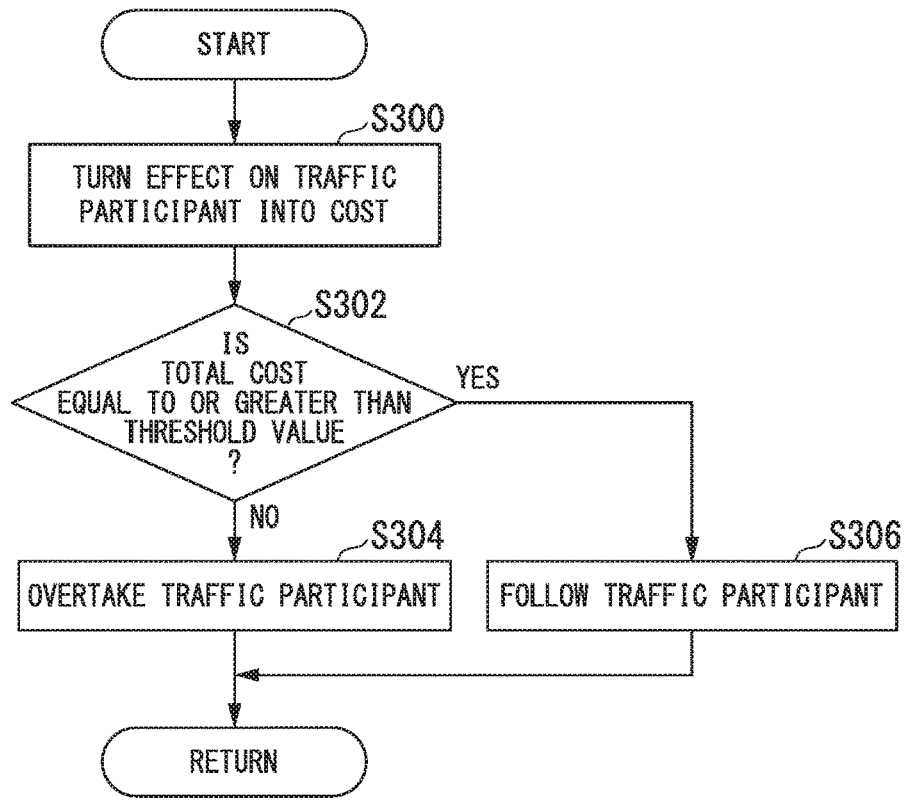
FIG. 10 is a flowchart which shows an example of a flow of processing executed in the automatic driving control device.

Next, a flow of processing executed in the automatic driving control device 100B will be described. FIG. 10 is a flowchart which shows an example of the flow of processing executed in the automatic driving control device 100B. This processing is executed, for example, in determination processing of step S106 of the first embodiment or step S206 of the second embodiment.

The following and overtaking control unit 142B turns the effect on the traffic participant in a case that it is assumed that the host vehicle M has overtaken the traffic participant into cost after the host vehicle M catches up with the traffic participant before the host vehicle M reaches the stop position on the basis of a result of recognition by the stop factor recognition unit 132B and the traffic participant recognition unit 134B (step S300). The following and overtaking control unit 142B evaluates whether the cost is equal to or greater than a predetermined threshold value (step S302).

In a case that the cost is less than the predetermined threshold value in step S302, the following and overtaking control unit 142B determines to cause the host vehicle M to perform overtaking and the like on the traffic participant (step S304). In a case that the cost is equal to or greater than the predetermined threshold value in step S302, the following and overtaking control unit 142B determines to cause the host vehicle M to follow the traffic participant (step S306).

According to the third embodiment as described above, the automatic driving control device 100B turns the effect on the traffic participant into cost and evaluates it on the basis of a specific reference, thereby preventing the host vehicle M from approaching the traffic participant, reducing an effect on the traffic participant, and performing protection of the traffic participant more reliably.

Hardware Configuration

Figure 11:
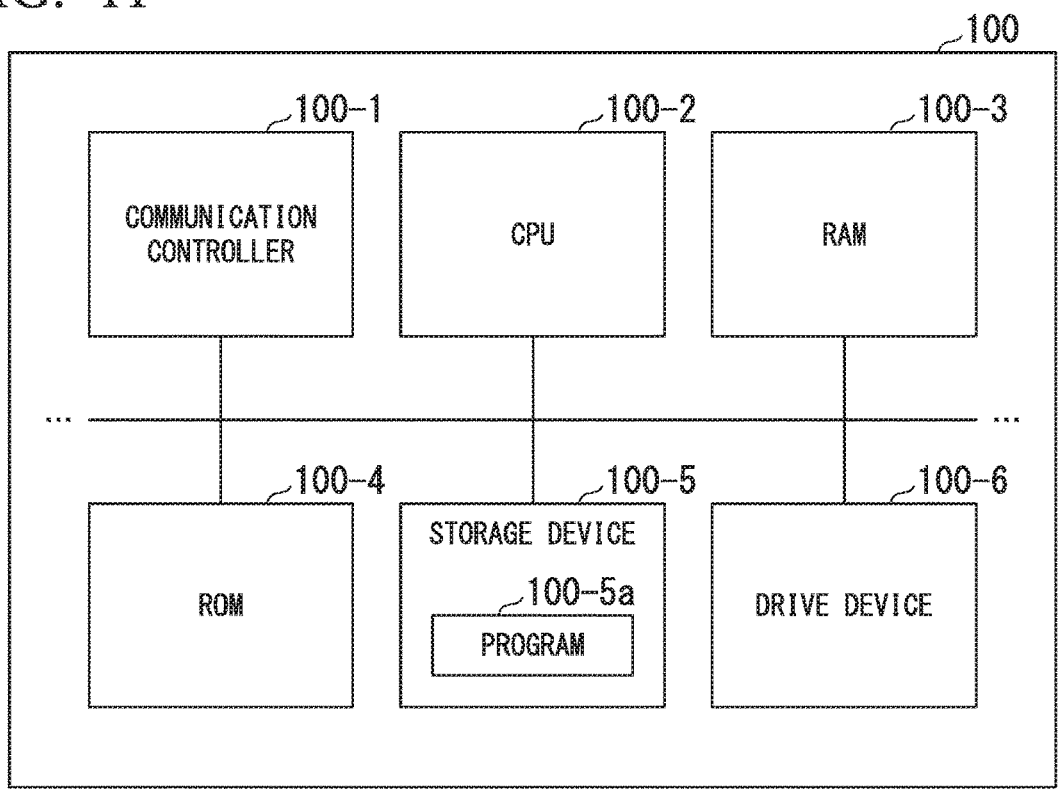
FIG. 11 is a diagram which shows an example of a hardware configuration of the automatic driving control device according to an embodiment.

FIG. 11 is a diagram which shows an example of a hardware configuration of the automatic driving control device 100 according to an embodiment. As shown in FIG. 11, the automatic driving control device 100 has a configuration in which a communication controller 100-1, a CPU 100-2, a random access memory (RAM) 100-3 used as a working memory, a read only memory (ROM) 100-4 storing a boot program, a storage device 100-5 such as a flash memory or a hard disk drive (HDD), a drive device 100-6, and the like are connected to one another using an internal bus or a dedicated communication line. The communication controller 100-1 communicates with components other than the automatic driving control device 100. The storage device 100-5 stores a program 100-5a executed by the CPU 100-2. This program is developed in the RAM 100-3 by a direct memory access (DMA) controller (not shown) and the like, and executed by the CPU 100-2. As a result, some or all of the stop factor recognition unit 132, the traffic participant recognition unit 134, and the following and overtaking control unit 142 are realized. The hardware configuration shown in FIG. 11 is the same for the automatic driving control devices 100A and 100B.

The embodiments described above can be expressed as follows.

A vehicle control apparatus is configured to include a storage device which stores a program, and a hardware processor, in which the hardware processor executes a program stored in the storage device, thereby recognizing a surrounding situation of a vehicle, automatically controlling acceleration or deceleration and steering of the vehicle on the basis of a recognized surrounding situation, determining, in a case that a stop position of the vehicle is recognized in a traveling direction of the vehicle, and a traffic participant proceeding at a speed lower than the speed of the vehicle in the traveling direction is recognized in front of the stop position, whether the vehicle catches up with the traffic participant before the vehicle reaches the stop position, and determining whether to cause the vehicle to reach further ahead of the traffic participant in the traveling direction on the basis of a result of the determination.

As described above, although a mode for carrying out the present invention has been described using embodiments, the present invention is not limited to these embodiments at all, and various modifications and substitutions can be made within a range not departing from the gist of the present invention.

DRAWINGS

[FIG. 1]
10 CAMERA
12 RADAR DEVICE 16
14 FINDER
16 OBJECT RECOGNITION DEVICE
20 COMMUNICATION DEVICE
30 HMI
40 VEHICLE SENSOR
50 NAVIGATION DEVICE
51 GNSS RECEIVER
52 NAVIGATION HMI
53 ROUTE DETERMINATION UNIT
54 FIRST MAP INFORMATION
61 RECOMMENDED LANE DETERMINATION UNIT
62 SECOND MAP INFORMATION
80 DRIVING OPERATOR
100 AUTOMATIC DRIVING CONTROL DEVICE
120 FIRST CONTROL UNIT
160 SECOND CONTROL UNIT
200 TRAVELING DRIVING FORCE OUTPUT DEVICE
210 BRAKE DEVICE
220 STEERING DEVICE
[FIG. 2]
120 FIRST CONTROL UNIT
130 RECOGNITION UNIT
  RECOGNITION RESULT
  TARGET TRAJECTORY
140 ACTION PLAN GENERATION UNIT
132 STOP FACTOR RECOGNITION UNIT
134 TRAFFIC PARTICIPANT RECOGNITION UNIT
142 FOLLOWING AND OVERTAKING CONTROL UNIT
160 SECOND CONTROL UNIT
162 ACQUISITION UNIT
164 SPEED CONTROL UNIT
166 STEERING CONTROL UNIT
[FIG. 6]
S100 IS STOP POSITION RECOGNIZED?

S102 IS THERE TRAFFIC PARTICIPANT IN FRONT OF STOP POSITION?
S103 IS THERE TRAFFIC PARTICIPANT?
S104 DOES HOST VEHICLE CATCH UP WITH TRAFFIC PARTICIPANT?
S106 IS THERE EFFECT ON TRAFFIC PARTICIPANT?
S112 PERFORM NORMAL TRAVELING
S108 OVERTAKE TRAFFIC PARTICIPANT
S110 FOLLOW TRAFFIC PARTICIPANT
[FIG. 7]
120A FIRST CONTROL UNIT
130A RECOGNITION UNIT
RECOGNITION RESULT
TARGET TRAJECTORY
140A ACTION PLAN GENERATION UNIT
132A STOP FACTOR RECOGNITION UNIT
134A TRAFFIC PARTICIPANT RECOGNITION UNIT
142A FOLLOWING AND OVERTAKING CONTROL UNIT
160 SECOND CONTROL UNIT
162 ACQUISITION UNIT
164 SPEED CONTROL UNIT
166 STEERING CONTROL UNIT
[FIG. 8]
S200 IS STOP POSITION RECOGNIZED?
S202 IS THERE TRAFFIC PARTICIPANT IN FRONT OF STOP POSITION?
S203 IS THERE TRAFFIC PARTICIPANT?
S204 DOES HOST VEHICLE CATCH UP WITH TRAFFIC PARTICIPANT?
S206 IS THERE EFFECT ON TRAFFIC PARTICIPANT?
S212 PERFORM NORMAL TRAVELING
S208 OVERTAKE TRAFFIC PARTICIPANT IN ACCORDANCE WITH ATTRIBUTES OF TRAFFIC PARTICIPANT
S210 FOLLOW TRAFFIC PARTICIPANT IN ACCORDANCE WITH ATTRIBUTES OF TRAFFIC PARTICIPANT
[FIG. 9]
120B FIRST CONTROL UNIT
130B RECOGNITION UNIT
RECOGNITION RESULT
TARGET TRAJECTORY
140B ACTION PLAN GENERATION UNIT
132B STOP FACTOR RECOGNITION UNIT
134B TRAFFIC PARTICIPANT RECOGNITION UNIT
142B FOLLOWING AND OVERTAKING CONTROL UNIT
160 SECOND CONTROL UNIT
162 ACQUISITION UNIT
164 SPEED CONTROL UNIT
166 STEERING CONTROL UNIT
[FIG. 10]
S300 TURN EFFECT ON TRAFFIC PARTICIPANT INTO COST
S302 IS TOTAL COST EQUAL TO OR GREATER THAN THRESHOLD VALUE?
S304 OVERTAKE TRAFFIC PARTICIPANT
S306 FOLLOW TRAFFIC PARTICIPANT
[FIG. 11]
100-1 COMMUNICATION CONTROLLER
100-5 STORAGE DEVICE
100-5a PROGRAM
100-6 DRIVE DEVICE

What is claimed is:

1. A vehicle control apparatus comprising:
at least one memory storing instructions, and
at least one processer configured to execute the instructions to:
recognize a surrounding situation of a vehicle; and
automatically control acceleration or deceleration and steering of the vehicle based on the surrounding situation,
wherein, the at least one processor is configured to:
in response to recognizing a stop position of the vehicle in a traveling direction of the vehicle, and recognizing a traffic participant proceeding at a speed lower than a speed of the vehicle in the traveling direction in front of the stop position, determine whether the vehicle catches up with the traffic participant before the vehicle reaches the stop position,
based on a result of a determination that the vehicle catches up with the traffic participant, determine whether the traffic participant catches up with the vehicle stopped at the stop position if the vehicle is caused to overtake the traffic participant,
based on a result of a determination that the traffic participant catches up with the vehicle stopped at the stop position, determine whether to cause the vehicle to reach further ahead of the traffic participant in the traveling direction, and
based on a result of a determination that the traffic participant does not catch up with the vehicle stopped at the stop position, determine to cause the vehicle to reach further ahead of the traffic participant in the traveling direction.

2. The vehicle control apparatus according to claim 1, wherein, the at least one processor is further configured to:
in response to determining that the vehicle does not obstruct a passage of the traffic participant, determine to cause the vehicle to reach further ahead of the traffic participant in the traveling direction.

3. The vehicle control apparatus according to claim 1, wherein, the at least one processor is further configured to:
in response to determining that a distance between a position at which the vehicle catches up with the traffic participant and the stop position is a predetermined distance or more, determine to cause the vehicle to reach further ahead of the traffic participant in the traveling direction.

4. The vehicle control apparatus according to claim 1, wherein, the at least one processor is further configured to:
in response to determining that a following time in a case in which the vehicle is not caused to reach further ahead of the traffic participant is predicted to be equal to or more than a predetermined time, determine to cause the vehicle to reach further ahead of the traffic participant in the traveling direction.

5. The vehicle control apparatus according to claim 1, wherein the at least one processor is further configured to:
determine whether to cause the vehicle to reach further ahead of the traffic participant in the traveling direction in accordance with an attribute of the traffic participant.

6. The vehicle control apparatus according to claim 1, wherein, the at least one processor is further configured to:
in response to determining that the vehicle catches up with the traffic participant before the vehicle reaches the stop position, perform an evaluation of a total of cost of a risk occurring in the traffic participant, and determine to cause the vehicle to reach further ahead of the traffic participant in the traveling direction based on a result of the evaluation.

7. The vehicle control apparatus according to claim 1, wherein the traffic participant is a non-motorized vehicle or a pedestrian.

8. A vehicle control method, comprising:
recognizing, by a computer comprising a processor, a surrounding situation of a vehicle;
automatically controlling, by the computer, acceleration or deceleration and steering of the vehicle based on the surrounding situation;
determining, in response to recognizing a stop position of the vehicle in a traveling direction of the vehicle, and recognizing a traffic participant proceeding at a speed lower than a speed of the vehicle in the traveling direction in front of the stop position, whether the vehicle catches up with the traffic participant before the vehicle reaches the stop position;
in response to determining that the vehicle catches up with the traffic participant, determining, by the computer, whether the traffic participant catches up with the vehicle stopped at the stop position if the vehicle is caused to overtake the traffic participant;
in response to determining that the traffic participant catches up with the vehicle stopped at the stop position, determining, by the computer, whether to cause the vehicle to reach further ahead of the traffic participant in the traveling direction; and
in response to determining that the traffic participant does not catch up with the vehicle stopped at the stop position, determining, by the computer, to cause the vehicle to reach further ahead of the traffic participant in the traveling direction.

9. A computer readable non-transitory storage medium storing a program that, in response to execution, causes a computer to
recognize a surrounding situation of a vehicle;
automatically control acceleration or deceleration and steering of the vehicle based on the surrounding situation;
determine, in a case that a stop position of the vehicle is recognized in a traveling direction of the vehicle, and a traffic participant proceeding at a speed lower than a speed of the vehicle in the traveling direction in front of the stop position is recognized, whether the vehicle catches up with the traffic participant before the vehicle reaches the stop position;
based on a result of a determination that the vehicle catches up with the traffic participant, determine whether the traffic participant catches up with the vehicle stopped at the stop position if the vehicle is caused to overtake the traffic participant;
based on a result of a determination that the traffic participant catches up with the vehicle stopped at the stop position, determine whether to cause the vehicle to reach further ahead of the traffic participant in the traveling direction; and
based on a result of a determination that the traffic participant does not catch up with the vehicle stopped at the stop position, determine to cause the vehicle to reach further ahead of the traffic participant in the traveling direction.

* * * * *